United States Patent [19]

Akaike et al.

[11] Patent Number: 5,310,038
[45] Date of Patent: May 10, 1994

[54] POSITIONING MECHANISM FOR POSITIONING A PALLETIZED DEVICE ON A PROCESSING APPARATUS

[75] Inventors: Yoshifumi Akaike, Tokyo; Katsunori Ishii, Kanagawa, both of Japan

[73] Assignee: Sony Corporation, Japan

[21] Appl. No.: 924,463

[22] Filed: Aug. 4, 1992

[30] Foreign Application Priority Data

Aug. 16, 1991 [JP] Japan .................. 3-229645

[51] Int. Cl.$^5$ ............................................ B65G 21/00
[52] U.S. Cl. .................... 198/345.3; 414/749; 29/33 P
[58] Field of Search ........... 414/749, 754; 29/33 P; 198/345.3, 803.01, 803.02, 465.1, 465.3, 349, 352, 353, 354

[56] References Cited

U.S. PATENT DOCUMENTS

| | | | |
|---|---|---|---|
| 3,854,889 | 12/1974 | Lemelson | 198/465.1 X |
| 4,033,450 | 7/1977 | Paddock et al. | 198/803.01 |
| 4,583,631 | 4/1986 | Yonezawa et al. | 198/465.1 X |
| 4,827,598 | 5/1989 | Sakamoto et al. | 198/465.1 X |
| 5,178,260 | 1/1993 | Hochbein | 198/803.01 |

FOREIGN PATENT DOCUMENTS

0124421  6/1986  Japan .................. 198/803.01

*Primary Examiner*—Michael S. Huppert
*Assistant Examiner*—Donald W. Underwood
*Attorney, Agent, or Firm*—Ronald P. Kananen

[57] ABSTRACT

The present invention provides a positioning mechanism for positioning, on a processing apparatus, a device mounted on a pallet transported by a conveyor to the processing apparatus. The positioning mechanism is provided with an information communication arrangement capable of storing adjustment data of the device by preceding processing apparatus. The data stored in the information communication arrangement is used in processing the device by the processing apparatus to enable the processing apparatus to process the device using the least number of necessary processing steps.

3 Claims, 3 Drawing Sheets

POSITIONING MECHANISM FOR POSITIONING A PALLETIZED DEVICE ON A PROCESSING APPARATUS

BACKGROUND OF THE INVENTION

1. Field of the Invention

The present invention relates to a positioning mechanism for positioning a palletized device in a processing apparatus.

2. Description of the Prior Art

In subjecting a device mounted on a pallet and transported by a conveyor for sequentially processing by different processing apparatuses installed at different processing stations, one previously proposed loading method transfers only the device from the pallet to the processing apparatus and positions the device on the processing apparatus. Another loading method transfers the pallet holding the device to the processing apparatus under the conditions wherein the pallet can be accurately positioned on the processing apparatus and the device is positioned accurately on the pallet. The former loading method requires the transfer of the device from the pallet to the processing apparatus and then from the processing apparatus to the pallet, at each processing station. This of course increases processing time. The latter loading method is difficult to implement because the error in positioning the device on the pallet and in positioning the pallet on the processing apparatus is far greater than the processing error incurred during the actual processing of the device.

In some cases, data representing the qualitative condition of adjustment of the device on the processing apparatus needs to be recorded, or the data of adjustment of the device in the preceding processes needs to be used. In such cases, adjustment data of the device needs to be written down or stored on a recording medium by an information recording apparatus, and preparatory work and determination of conditions for the adjustment of the device then needs to be carried out.

SUMMARY OF THE INVENTION

The present invention has been proposed in view of the foregoing problems in the prior art and it is therefore an object of the present invention to provide a positioning mechanism for positioning a palletized device requiring highly accurate adjustment on a processing apparatus, which is capable of positioning the pallet holding the device with a high degree of accuracy and for making reference to the data of adjustment of the device. The positioning mechanism includes an information communicating means provided on the pallet for transferring information concerning the data of adjustment of the device.

BRIEF DESCRIPTION OF THE DRAWINGS

The above and other objects, features and advantages of the present invention will become more apparent from the following description taken in connection with the accompanying drawings, in which.

DETAILED DESCRIPTION OF THE PREFERRED EMBODIMENTS

Figure 1:
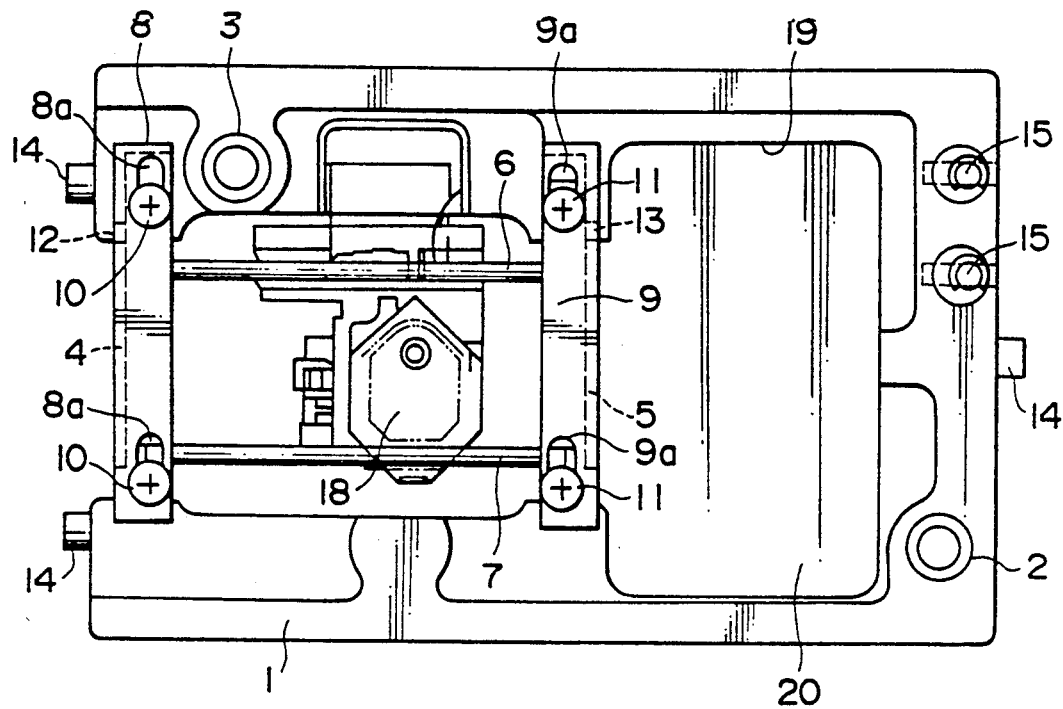
FIG. 1 is a plan view of a positioning mechanism according to a preferred embodiment of the present invention.

According to a first aspect of the present invention, a positioning mechanism for positioning and positioning a palletized device on a processing apparatus includes an information communicating means which is provided on the pallet and which communicates (viz. transfers) information concerning the device.

According to a second aspect of the present invention, a positioning mechanism for positioning a palletized device on a processing apparatus comprises: a pallet which is provided with positioning holes for positioning the pallet on a processing apparatus; a first positioning shaft which is slidably mounted on the pallet so as to be inserted in a positioning hole formed in the device; a second positioning shaft which is mounted on the pallet parallel to the first positioning shaft so as to be engageable with a positioning groove formed in the device for restraining the device from axial movement; a shutter member capable of preventing the axial movement of the first positioning shaft; and a positioning member for determining the axial position of the device on the pair of positioning shafts.

The information communicating means of the positioning mechanism enables communication of data relating to the adjustment of the device to the processing apparatuses. The processing apparatuses use the adjustment data in connection with the processing of the device and record the data of processing work exerted on the device.

The pallet holding the device can be positioned correctly on the processing apparatus by fitting the positioning shafts of the processing apparatus in the positioning holes of the pallet. Since the device is supported on the pair of positioning shafts which are movable relative to the pallet, the device is displaceable relative to the pallet within a predetermined range. Accordingly, in positioning the device on the processing apparatus, the pallet and the device can be individually positioned on and fastened to the processing apparatus. This prevents the accumulation of error in the positioning of the device on the pallet and an error in the positioning of the pallet on the processing apparatus. Accordingly, processing accuracy in fabricating the pallet need not be very high. The possibility of removing the first positioning shaft by opening the shutter member facilitates mounting the device on the positioning shafts. The device supported on the positioning shaft can be positioned by the positioning member.

A positioning mechanism in a preferred embodiment according to the present invention will be described hereinafter the reference to the accompanying drawings.

Referring to FIGS. 1 to 5, a pallet 1 having a shape substantially resembling a rectangular plate is provided with positioning holes 2 and 3 for positioning the pallet 1 on a processing apparatus, not show, in diagonally opposite corners thereof, respectively. In order to position the pallet 1 on the processing apparatus, positioning shafts, not shown, which are provided on the processing apparatus, are received respectively in the positioning holes 2 and 3 to position the pallet correctly on the processing apparatus. The pallet 1 is provided with a pair of integral support seats 4 and 5 which protrude from the upper surface of the pallet 1 and extend in parallel to the shorter sides of the pallet 1. A first positioning shaft 6 and a second positioning shaft 7 extend between the support seats 4 and 5 parallel to the longer sides of the pallet 1.

The first positioning shaft 6 is axially movable relative to the support seats 4 and 5, and can be removed from the pallet 1. The second positioning shaft 7 is not axially movable with respect to the support seats 4 and 5. The positioning shafts 6 and 7 are inserted in holes having diameters greater than those of the positioning shafts 6 and 7, respectively, so that the positioning shafts 6 and 7 are displaceable relative to the pallet 1 within a predetermined range of movement.

Shutter members 8 and 9 each resembling the letter L in cross section are secured to the support seats 4 and 5, respectively. The shutter members 8 and 9 are provided with a pair of slots 8a and a pair of slots 9a, respectively. Guide pins 10 project from the support seat 4 and extend through the slots 8a to limit the movement of the shutter member 8 along the short sides of the shutter member 8 within a predetermined range. Guide pins 11 project from the support seat 5 and pass through the slots 9a to limit the movement of the shutter member 9 along the short sides of the shutter member 9 within a predetermined range. Holes 12 and 13 are formed respectively in the respective side walls of the shutter members 8 and 9. The longitudinal positions of the shutter members 8 and 9 can be adjusted to bring the holes 12 and 13 into alignment with the holes formed in the support seats 4 and 5 and to receive the first positioning shaft 6.

Figure 2:
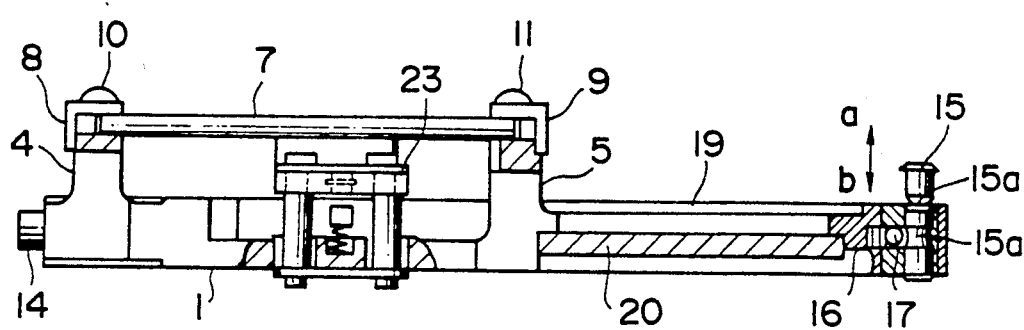
FIG. 2 is a plan view partly in section of the positioning mechanism of FIG. 1.
Figure 3:
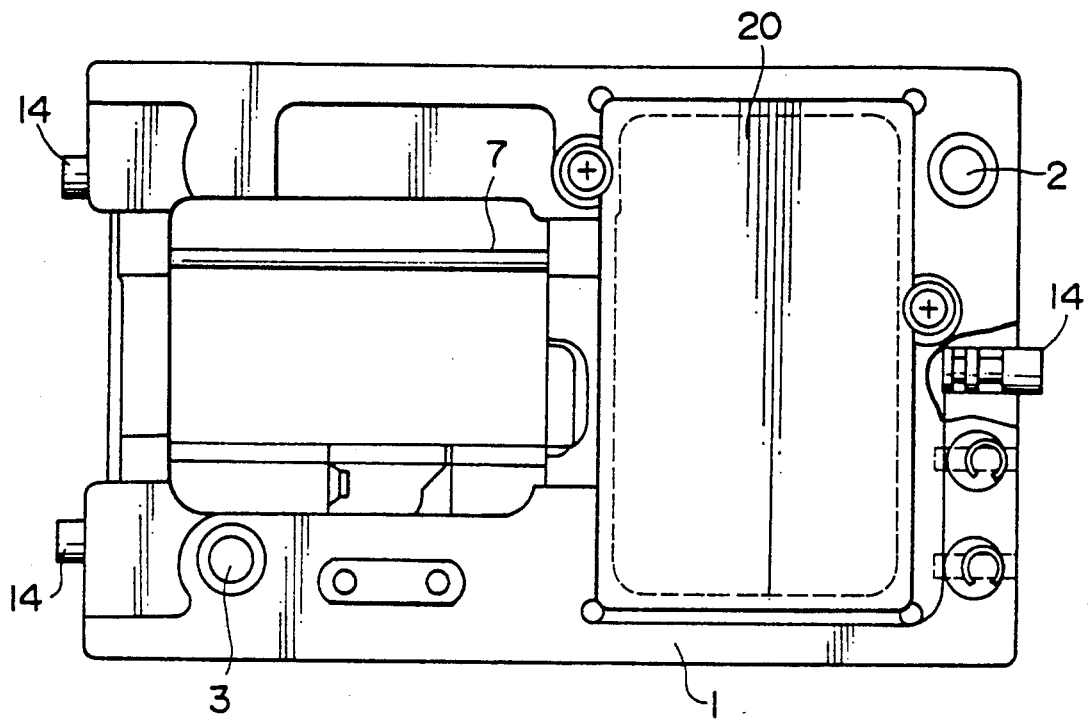
FIG. 3 is a bottom plan view of the positioning mechanism of FIG. 1.
Figure 4:
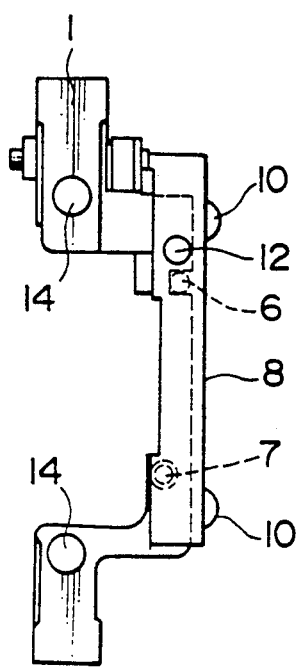
FIG. 4 is a side elevation of the positioning mechanism of FIG. 1 as viewed from the left side of FIG. 1.
Figure 5:
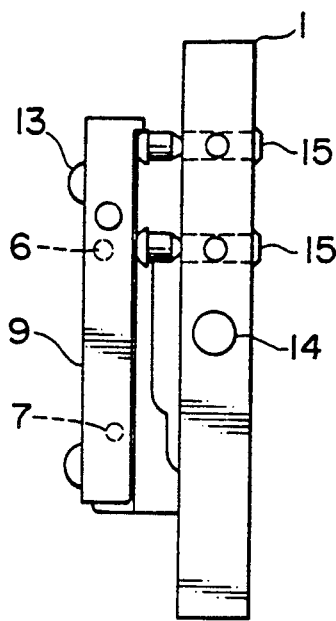
FIG. 5 is a side elevation of the positioning mechanism of FIG. 1 as viewed from the right side of FIG. 1.

Two dampers 14 which also serve as stoppers, are formed on the left end, as viewed in FIG. 1, of the pallet 1. Another damper 14 serves as a stopper and is formed on the right end, as viewed in FIG. 1, of the pallet 1. A pair of flags 15 are attached to the upper surface of the right end of the pallet 1. As shown in FIG. 2, the flags 15 have a substantially cylindrical shape and are axially movable relative to the pallet 1. Two annular grooves 15a are formed in each flag 15. A ball 17 is pressed in the annular groove 15a by a spring provided in a hole formed in the pallet 1, to hold each flag 15 in place in the pallet 1. The flag 15 is movable by an external force in the directions of the arrow a-b to indicate the qualitative condition of the device 18 for a device such as an optical pickup device, for recording reproducible information on a compact disk. An LSI (Large Scale Integration) card 20, i.e., an information communicating means, is retained in a card holding portion 19.

Figure 6:
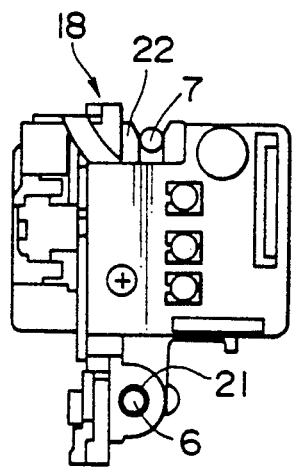
FIG. 6 is a side elevation of a device.
Figure 7:
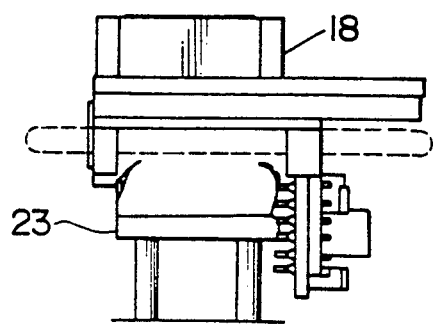
FIG. 7 is a view which depicts the function of a positioning member included in the positioning mechanism of FIG. 1.

As shown in FIG. 6, the device 18 is provided at its opposite sides with a positioning hole 21 and a positioning groove 22 which extend parallel to the axis of the positioning hole 21, respectively. The first positioning shaft 6 and the second positioning shaft 7 engage the positioning hole 21 and the positioning groove 22, respectively, to support the device 18 on the pallet 1. When supported by the positioning shafts 6 and 7 on the pallet 1, the device 18 is located over a vertically movable positioning member 23 of the pallet 1. The positioning member 23 is raised and fitted into a recess formed in the bottom surface of the device 18 as shown in FIG. 7 to restrain the device 18 from movement in the axial direction of the positioning shafts 6 and 7.

In operation, the shutter members 8 and 9 are moved along the guide pins 10 and 11 which engage in the slots 8a and 9a to bring the holes 12 and 13 of the shutter members 8 and 9 into alignment with the holes formed in the support seats 4 and 5 of the pallet 1 and to receive the first positioning shaft 6. Following this, the first positioning shaft 6 is removed from the pallet 1. Next, with the positioning member 23 in its lower position, the device 18 is placed on the pallet 1 with the positioning groove 22 thereof receiving the second positioning shaft 7 and with the positioning hole 21 aligned with the holes of the support seats 4 and 5 for receiving the first positioning shaft 6. The first positioning shaft 6 is then inserted through the holes 12 and 13 of the shutter members 8 and 9 into the positioning hole 21 of the device 18. Next, the shutter members 8 and 9 are shifted to hold the first positioning shaft 6 at its opposite ends. Finally, the positioning member 23 is raised so as to engage the device 18 to restrain the device 18 from axial movement.

The pallet 1 is mounted on the processing apparatus and is positioned by the positioning pins which engage the positioning holes 2 and 3. Since the device 18 is mounted on the positioning shafts 6 and 7 and loosely supported on the support seats 4 and 5, the device 18 is movable relative to the pallet 1 within a predetermined range. Thus, the pallet 1 and the device 18 can be individually positioned on the processing apparatus and hence the device 18 can be positioned with a high degree of positional accuracy on the processing apparatus regardless of the positional accuracy of the pallet 1 on the processing apparatus.

The functions of the flags 15 and the LSI card 20 will be described hereinafter. Each of a series of processing apparatus determines the results of processing of the device 18 in the preceding processing apparatus from the position of the flags 15 and sends only pallets which support satisfactorily processed devices, to the next processing apparatus. The data of adjustment and assembling of the device 18 by each processing apparatus is recorded on the LSI card 20 and the data is reproduced from the LSI card 20 by a magnetic head. Thus, the processing apparatus is able to adjust or assemble the device 18 with reference to the data recorded on the LSI card 20 in processing the device on the preceding processing apparatuses.

In adjusting or assembling the device 18, the device 18 requires fine adjustment or assembling work unique thereto. Therefore, the processing apparatus shifts its mechanical components to positions which are optimal for processing the device 18 and/or performs preparatory operations for expected processing actions. After the final process has been completed, the adjustment and assembling data recorded in all the processes, is examined to evaluate the quality of the device 18. The data can be used also for production control.

Thus, the positioning mechanism prevents the accumulation of positional errors in positioning the device 18 on the pallet 1 and in positioning the pallet 1 on the processing apparatus, so that the device 18 can be positioned with a high degree of positional accuracy on the processing apparatus. The pallet 1 therefore need not be formed with a very high degree of machining accuracy.

Furthermore, the adjustment and assembling data of the device obtained in the preceding processes and recorded on the LSI card enables the processing apparatus to carry out adjustment and assembling operations for the device through the least number of necessary processing steps and facilitates detecting defects in an unacceptable device by readjusting and reassembling the unacceptable device.

Although the present invention has been described as applied to adjusting and assembling an optical pickup device, i.e., the device 18, naturally, the present invention is applicable to adjusting and assembling devices other than the optical pickup device and the present invention may be practiced otherwise than as specifically described herein without departing from the scope and spirit thereof.

As is apparent from the foregoing description, the positioning mechanism of the present invention supports a device to be subjected to adjustment and assembling by the positioning shafts on the pallet so that the device can be moved in a predetermined range on the pallet and thus the positioning mechanism is capable of positioning the device in a high positional accuracy on the processing apparatus.

Furthermore, the data of adjustment and assembling of the device obtained in the preceding processes and stored in the information communicating means enables the processing apparatus to carry out adjusting and assembling work using the least number of necessary processing steps and facilitate production control.

What is claimed is:

1. A positioning mechanism for supporting a device on a pallet which has an upper major face and positioning holes which are adapted to receive positioning pins, comprising:

first and second parallel support seats which respectively project upwardly from the upper major face of the pallet, said first support seat having first and second holes formed therein, said second support seat having third and fourth holes formed therein;

first and second positioning shafts for supporting the device on the pallet, said first and second positioning shafts being parallel to one another and extending between and loosely supported by said first and second support seats, said first positioning shaft being disposed in said first and third holes, said second positioning shaft being disposed in said second and fourth holes, said first and third and said second and fourth holes having diameters which are respectively greater than said first and second positioning shafts; and a positioning member which is supported on the pallet and movable upwardly toward said first and second positioning shafts, said positioning member being directly engageable with a device which is supported on said first and second positioning shafts.

2. A positioning mechanism as set forth in claim 1, further comprising a memory card which is detachably seated in a recess formed in the major face of the pallet, said memory card forming part of a communication means for receiving, storing and transmitting data to and from processing apparatuses relating to the device which is supported on said first and second positioning shafts.

3. A positioning mechanism as set forth in claim 1, further comprising a resilient damper which is disposed in an edge of the pallet, said damper being engageable with a surface when the pallet is disposed on a processing apparatus.

* * * * *